United States Patent Office 3,290,348
Patented Dec. 6, 1966

3,290,348
COBALT(O) COMPLEXES OF PHOSPHORUS ESTERS
Richard D. Mullineaux, Oakland, Calif., assignor to Shell Oil Company, New York, N.Y., a corporation of Delaware
No Drawing. Filed Apr. 25, 1963, Ser. No. 275,517
14 Claims. (Cl. 260—439)

This invention is a continuation-in-part of copending application Serial No. 29,129, filed May 16, 1960, and now abandoned.

This invention relates to complexes of certain metals and of certain phosphorus compounds, and their preparation. More particularly, it relates to novel complexes between cobalt or nickel, in a low valence state, and trivalent phosphorous compounds. It also relates to the process for preparing complexes between cobalt or nickel and trivalent phosphorus compounds wherein the valence state of the metal is lowered simultaneously with the formation of the complex.

A principal object of the present invention is to provide novel complexes between cobalt or nickel and trivalent phosphorus compounds and a porcess for preparing them. A further object of the invention is to provide an improved process enabling the more efficient production of complexes between cobalt or nickel and trivalent phosphorus compounds wherein the valence state of the metal is lowered simultaneously with the formation of the complex. Other objects will be apparent from the following detailed disclosure of the invention.

These objects have now been attained by the discovery of new complexes comprising one or more atoms of cobalt or nickel. In its generic aspects, the invention provides novel complexes between cobalt or nickel, in a valence state of less than +1, and a trivalent phosphorus compound having three RO-radicals bonded to the phosphorus atom, wherein R is a member of the class consisting of the hydrocarbyl radicals, such as, for example, alkyl, aryl, alkaryl, and aralkyl radicals, and the halo-substitution products thereof.

The term "complex," as used throughout the specification and claims, means a coordination compound formed by the union of one or more already electronically rich molecules or atoms capable of independent existence with one or more electronically poor molecules or atoms, each of which is also capable of independent existence.

The complexes within the scope of the invention are complexes containing cobalt or nickel, with the further proviso that the cobalt and nickel must be in a valence state of less than +1.

The other portion of the complexes of the invention is the indicated trivalent phosphorus moiety, namely organic phosphite. While many different metal-phosphorus complexes are known in the art, the complexes of the present invention are uniquely characterized in part by the ester portion of the complex. This portion of the complex comprises a trivalent phosphorus compound having three oxygen atoms bonded directly to a phosphorus atom and wherein each oxygen atom is in turn linked directly to a radical R, defined above. The complexes of the present invention have four such ester molecules (phosphites of aliphatic and aromatic alcohols) for each cobalt or nickel atom. In the phosphite moiety of the novel complexes, which may be represented by the general formula P(OR)$_3$, the radical R, which as defined above represents hydrocarbyl or substituted hydrocarbyl, may contain over 20 carbon atoms and vary in structure over a considerable range. Preferred complexes comprise those, however, wherein each R contains up to 20 carbon atoms, preferably an alkyl radical of up to about 20 carbon atoms, since the rate of formation of the complexes containing such alkyl radicals is more rapid and the complexes possess highly desirable characteristics. When R is alkyl, straight- and branched-chain alkyl groups are equally suitable. The suitable halo-substituted organic phosphite moiety of the complex preferably comprises one wherein R is halo-substituted alkyl of 1 to 20 carbons and the halogen substituents are chlorine, bromine, or fluorine, the middle halogens being particularly preferred.

Comprised within the scope of the present invention are the complexes between cobalt, or nickel, and trivalent phosphorus-containing compounds wherein the trivalent phosphorus moiety is represented by the general formula

wherein R', R" and R''' each represent the same or a different hydrocarbyl radical selected from the broad class defined above as R, and of which any two may be joined to form a closed ring structure.

The number of complexes comprised in the scope of the invention is large. A representative sample, only, includes the complexes between cobalt or nickel and one of the following, in which complexes, the metal is in all cases in a valence state of less than +1: trimethyl phosphite; triethyl phosphite; tributyl phosphite; tri(2-ethylhexyl) phosphite; tricresyl phosphite tri($\beta$-chloroethyl) phosphite; triphenyl phosphite; tris(2,6-dibromo-4-methylphenyl) phosphite; etc.

Generally, the structure of the complexes of the present invention is composed of one atom of cobalt, or nickel, and a plurality of the phosphorus compound molecules. Several of these monomers may be joined together to form larger basic units. For example, the complex between cobalt(O) and triethyl phosphite generally forms in the ratio of one cobalt atom to four triethyl phosphite molecules with the basic unit being the dimer, dicobalt octa-triethyl phosphite, or the monomer, tetrakis(triethyl phosphite)cobalt(O). Similarly the complexes between nickel(O) and triethyl phosphite of the invention comprise dinickel octa-triethyl phosphite and tetrakis(triethyl phosphite)nickel(O).

These novel complexes find use as gasoline additives to serve as antiknock agents. They have also been found to be successful homogeneous hydrogenation catalysts. The unique structure of these novel complexes makes them particularly suitable for this latter purpose. Specifically, the valence state of less than +1 in the complexes contributes heavily to the over-all activity of the catalyst in the hydrogenation reaction.

The complexes within the scope of the present invention are prepared by dissolving a salt of cobalt, or nickel, in a trivalent phosphorus compound, for example, of the type already mentioned, and hydrogenating the resulting solution. The process of the invention may, therefore, best be described as a process for lowering the valence state of cobalt, or nickel, while simultaneously preparing a complex between the metal and a trivalent phosphorus compound having three RO— radicals bonded to the phosphorus atom, wherein R is hydrocarbyl, for example, alkyl, aryl, alkaryl, and aralkyl as well as halo-substitution products thereof, as defined herein above, which process comprises dissolving a salt of cobalt or nickel in said phosphorus compound and hydrogenating the resulting solution. Suitable trivalent phosphorus compounds used as starting materials comprise the trihydrocarbyl phosphites defined herein above.

Any salt of cobalt or nickel may be employed as starting material; in particular, their salts of organic acids, such as alkanoic acids, and of inorganic acids. It will of course be understood that the suitable salts of cobalt or nickel are substantially soluble in the specific phosphite employed therewith. The salts of strong, non-oxidizing inorganic acids, such as of the hydrohalic acids, salts of weak non-oxidizing inorganic acids, such as of HCN, and salts of such organic acids as carboxylic acids may be used. Examples of preferred cobalt or nickel salts are chlorides, bromides, cyanides, acetates, propionates, butyrates, and the like. Hydrated salts are equally useful in the process of the invention. Although salts of the foregoing monobasic acids are preferred, salts of polybasic acids such as sulfuric, the sulfonic acids, phosphoric, and the phosphonic acids may also be used.

The pressure and temperature of the system may be varied over a considerable range and still achieve the desired product. The particular metal chosen and the particular ester utilized will usually be the most important factor in governing the precise conditions to be used for optimum results. Temperatures in the range of from about 50° C. to about 200° C. have been successful with a variety of reactants. A hydrogen pressure of from about less than one atmosphere to about 100 atmospheres is suitably employed with that temperature range. It is preferred to carry out the described hydrogenation at about 100° C. under about one to about 10 atmospheres of hydrogen.

The complexes may be prepared from any mole ratio of the starting materials that will result in an appreciable amount of complex formation. A stoichiometric excess of the phosphorus compound over the cobalt or nickel salt will in general produce the desired results and is preferred, although smaller proportions of the phosphorus compound may be used if desired. Mole ratios of phosphorus compound to metal from about 10 to 1 to about 50 to 1 may be used with good results. Larger concentrations of the metal have the effect of causing an increase in the rate of hydrogen uptake by the solution. Additional increase in the rate of reduction may be accomplished by the addition to the solution of a minor amount of a suitable catalyst. Nitrobenzenes have been found to be suitable catalysts for this reaction.

The rate of reduction is also influenced by the particular phosphorus compound used for complex formation. For example, the rate of reduction of cobalt chloride decreases as the solvent is changed from triethyl phosphite to tri-(2-chloroethyl) phosphite to tricresyl phosphite.

and the maximum rate of reduction of $CoCl_2$ was faster than that of cobalt acetate in triethyl phosphite.

Regardless of the reactants and conditions employed, reduction proceeds relatively rapidly up to a point where a sharp break in the rate occurs, and then proceeds relatively slowly. This will be referred to as the "rate break" hereinafter. The rate break point is also influenced by the anion present. For example, only one atom of hydrogen is absorbed per atom of cobalt in $CoCl_2$ and $Co(CN)_2$ before the rate break, while two atoms of hydrogen are adsorbed per atom of cobalt in $Co(acetate)_2$ before the rate break. These quantities of hydrogen correspond to reduction of $Co^{++}$ to the valence states of $+1$ and 0, respectively. In all cases, complete reduction leads to the adsorption of 3 atoms of hydrogen per atom of cobalt with consequent reduction of cobalt to the $-1$ state. By employing suitable reactants and conditions it is thus possible to produce a complex having its cobalt or nickel component in different valence states from $-1$ to $+1$.

The following examples will best describe the specific steps in the process of the present invention and illustrate a means of producing the novel complexes. They will also serve to illustrate some of the above-discussed relationships between reactants, conditions, reaction rates, and products. It is to be expressly understood that the examples are given for illustration only and are not to be construed as limiting the invention herein described.

*Example I*

A 100-ml. stainless steel autoclave reactor was connected to a 0 to 100 p.s.i.a. transducer and to sources of hydrogen and vacuum. The volume of these external fittings was kept to a minimum to provide the maximum sensitivity of pressure to the change in number of millimoles of hydrogen present. The desired quantity of reactants was charged to the reactor, a Teflon-covered magnetic stirring bar was added, and the reactor was closed, evacuated and pressured with hydrogen until all foreign gases were displaced. The reactor was then heated under vacuum. After the temperature reached the desired point, the $H_2$ pressure was increased to the designated run pressure and the pressure reduction was recorded. If a large amount of hydrogen was absorbed, the reactor was repressurized at suitable intervals. The following results were obtained using 30 ml. of phosphite solution, 100° C., and 1500 mm. initial pressure.

| No. | Cobalt Salt Used | | Phosphite Used | KCN Added, millimoles | Added Substrate | Millimoles of $H_2$ | | |
|---|---|---|---|---|---|---|---|---|
| | Species | Millimoles | | | | Maximum Rate per Hour | Absorbed at Rate Break | Total Absorbed |
| 1 | $CoCl_2$ | 2 | Trimethyl | 4 | | 3.5 | 1.1 | 1.3 |
| 2 | $CoCl_2$ | 2 | Tri(2-ethylhexyl) | 4 | m-Nitrobenzene | 4.1 | 1.2 | 1.3 |
| 3 | $CoCl_2$ | 4 | Tri(2-ethylhexyl) | 8 | m-Nitrobenzene | 5.0 | 1.9 | [1] 2.4 |
| 4 | $CoCl_2$ | 2 | Tri(2-ethylhexyl) | | m-Nitrobenzene | 1.4 | 1.1 | 1.4 |
| 5 | $CoCl_2$ | 2 | Tris(β-chloroethyl) | 4 | | 8.6 | | [2] 1.8 |
| 6 | $CoCl_2$ | 4(2) | $(C_2H_5O)_3P$ | 4(2) | | 46.5 | 2.0 | 4.6 |
| 7 | $Co(acetate)_2$ | 4(2) | $(C_2H_5O)_3P$ | | | 2.2(1.1) | 4.0(2.0) | [3] 5.2(2.6) |
| 8 | $Co(acetate)_2 \cdot 4H_2O$ | 2 | $(C_2H_5O)_3P$ | | | 0.7 | | 2.6 |
| 9 | $CoCl_2$ | 2 | $\left[ CH_3-\langle\bigcirc\rangle-O \right]_3 P$ | | | 2.0 | | [4] 1.3 |

[1] Slow reduction still occurring when run stopped.
[2] Reduction still occurring.
[3] 15 ml. of phosphite solution used; all figures corrected to 30 ml. of solution; actual results shown in parentheses.
[4] Not carried to completion.

These relative rates seem to indicate a steric inhibition to complex formation.

Both the rate and extent of reduction are influenced by the anion present. For example, the rate of reduction in the presence of $CN^-$ is greater than in the presence of $Cl^-$ which is in turn greater than in the presence of acetate. Thus the maximum rate of reduction of $CoCl_2$ in the presence of added $CN^-$ was faster than in its absence in tri-(2-ethylhexyl) phosphite-m-dinitrobenzene solution, The amounts of hydrogen absorbed in the above runs correspond to the formation of mixtures of cobalt in the $+1$ and 0 valence states (runs 1–5 and 9) and the 0 and $-1$ valence states (runs 6–8). Reduction of cobalt was evidenced by Gouy balance measurements which showed one unpaired electron per cobalt atom in the starting material but no unpaired electrons in the product. A pronounced color change also occurs on reduction. A solution of $CoCl_2$ in triethyl phosphite is dark green while the reduction product is pale yellow. Furthermore, CoCl$_2$ is slowly extracted from the phosphite solution by water to give the characteristic pink color of the Co$^{++}$ aqua ion. No such extraction occurs with the product, prolonged exposure of the reduced cobalt-triethyl phosphite solution to water giving no change of color in either phase.

*Example II*

Using the equipment and general procedure of Example I, the following series of runs was made under the conditions indicated:

| No. | Temp., °C. | Initial H$_2$ Pressure, mm. | Triethyl Phosphite, ml. | Co(acetate)$_2$, millimoles | Millimoles of H$_2$ | |
|---|---|---|---|---|---|---|
| | | | | | Absorbed at Rate Break | Maximum Rate per Hour |
| 1 | 100 | 1,500 | 15 | 2.0 | 2.0 | 1.1 |
| 2 | 100 | 1,500 | 15 | 4.0 | .42 | 5.4 |
| 3 | 100 | 1,500 | 8 | 2.0 | 2.2 | 5.6 |
| 4 | 100 | 1,500 | 4 | 2.0 | 2.1 | 4.6 |
| 5 | 80 | 4,500 | 60 | 29.1 | 28.5 | 110.7 |

In run No. 5, the absorption rate decreased from over 100 millimoles H$_2$ per hour to approximately 1 millimole per hour in less than 1 minute at the rate break. In runs 1–4, there was essentially no hydrogen absorption after the "rate break."

The equivalence of the amount of hydrogen absorbed to the amount of hydrogen required to reduce Co(acetate)$_2$ to cobalt in the zero valence state indicates that under the conditions employed, a cobalt (O-valence)-triethyl phosphite complex was produced.

A portion of the product of run No. 5 was removed after the rate break. Crystals were produced by refrigeration and were purified. Analysis of the product confirmed that it was a zero valence state complex with the empirical formula Co[P(OC$_2$H$_5$)$_3$]$_4$. The results of the analysis were:

| | Calculated, percent | Found, percent |
|---|---|---|
| Co | 8.2 | 8.8 |
| P | 17.1 | 17.1 |
| C | 39.8 | 39.6 |
| H | 8.4 | 8.5 |

If the reaction is allowed to proceed in run No. 5 of this example, under its higher pressure, or if the temperature is increased, complexes with the valence state of the metal less than zero may be obtained.

*Example III*

This example illustrates the preparation of complexes with the metal in a minus valence state. The following runs were made with Co(acetate)$_2$ in triethyl phosphite at 100° C. As previously explained, approximately 2 atoms of hydrogen are absorbed by one atom of Co$^{++}$ in an acetate salt before the rate break. By using a higher pressure and allowing the reaction to continue slowly after the rate break cobalt in a −1 state complex was obtained.

Absorption of three atoms of hydrogen per atom of Co$^{++}$ indicates the formation of a −1 valence state cobalt complex. The solution formed was not visibly different from that of the zero valence state complex of cobalt formed in Example II. The identity of the complex in this example is hydrogen tetrakis(triethyl phosphite) cobaltate (−1), with a probable structure

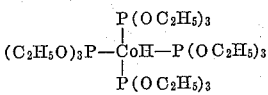

*Example IV*

The following run was made to further demonstrate the applicability of the process of the invention for lowering the valence state of nickel while simultaneously preparing a complex between it and compounds of trivalent phosphorus generally, and to further illustrate the preparation of the novel complexes within the scope of the present invention. Triethyl phosphite was used as the phosphorus compound and the run followed the general steps outlined in Example I.

2 millimoles NiCl$_2$·6H$_2$O
15 ml. ester
100° C.
29 p.s.i.a. initial H$_2$ pressure
Maximum rate of H$_2$ per hour: 2.5 millimoles
Total H$_2$ absorbed: 0.67 millimole

*Example V*

Four mmoles of ground NiCl$_2$·6H$_2$ (0.96 g.) and 113 mmole (15.0 ml.) of triethyl phosphite were placed in the autoclave which was swept with hydrogen and pressured with hydrogen to 1000 p.s.i.g. The autoclave was heated at 100–105° C. for 150 minutes. After being cooled, the product was transferred, with the aid of 80 ml. of isopentane, to a 250 ml. separatory funnel and under nitrogen was shaken with 100 ml. of water four or more times to remove-soluble materials including most of the excess triethyl phosphite. The isopentane solution was then dried with anhydrous sodium sulfate. The isopentane and a small amount of higher boiling liquid were removed by entrainment in a stream of nitrogen at room temperature. The residue, a white crystalline solid, analyzed as tetrakis-(triethyl phosphite)nickel. The yield was 1.81 grams or 63% based on nickel.

| | C | H | Ni | P |
|---|---|---|---|---|
| Calculated for [(C$_2$H$_5$O)$_3$P]$_4$Ni | 39.9 | 8.4 | 8.1 | 17.1 |
| Found | 39.4 | 8.3 | 9.0 | 17.4 |

| No. | Co(acetate)$_2$, millimoles | Triethyl Phosphite, ml. | Initial H$_2$ Pressure, p.s.i.a. | Millimoles of H$_2$ | | |
|---|---|---|---|---|---|---|
| | | | | Maximum Rate per Hour | Absorbed at Rate Break | Tobal Absorbed |
| 1 | 5 | 10 | 82 | 18.3 | 6 | 7.5 |
| 2 | 2 | 30 | 82 | 2.5 | 2.5 | 3.0 |
| 3 | 2 | 30 | 75 | 2.4 | 2.4 | 3.1 |
| 4 | 2 | 15 | 76 | 3.9 | 2.6 | 3.1 |

*Example VI*

Two mmoles (0.48 g.) of NiCl$_2$·6H$_2$O and 15.0 ml. of triethyl phosphite (113 mmole) were treated with hydrogen at an initial pressure of 30 p.s.i.g. at 100° C. for 173 minutes, during which there was a 10 p.s.i. drop. Isolation of the product in the same manner as described in foregoing Example V gave 1.32 grams (91% yield based on nickel) of tetrakis(triethyl phosphite)nickel(O).

Example VII

The experiment of foregoing Example V was repeated under substantially identical conditions but with the exception that the reduction was carried out under an initial pressure of 30 p.s.i.g. hydrogen. A 20 p.s.i. drop was observed after 222 minutes at 100–105° C. The yield of tetrakis(triethyl phosphite)nickel(O) was 1.18 g. or was 41% based on nickel.

Example VIII

Anhydrous nickel bromide (10.9 g., 0.05 mole) and 40 g. of triethyl phosphite were treated with hydrogen at 100–120° C. for 128 minutes with a maximum hydrogen pressure of 1240 p.s.i.g. The isopentane solution containing the product was obtained as described in Example V and concentrated at reduced pressure (100° C./1 mm.) to remove some of the excess phosphite. Upon chilling the product mixture in Dry Ice, white crystals separated which were filtered out under nitrogen, and analyzed as tetrakis-(triethyl phosphite)nickel(O).

Example IX

This example illustrates the effectiveness of tetrakis(tri-2-ethylhexyl phosphite)nickel(O) as a catalyst for the dimerization of butadiene. Into a 84 ml. autoclave was charged 27.0 g. (500 mmole) of butadiene, 1.0 g. (0.82 mmole) of tetrakis(tri-2-ethylhexyl phosphite)nickel(O) and 0.1 g. of 2,6-di-tert-butyl-p-cresol as antioxidant. The solution was heated to 140° C., at which temperature reaction commenced. The temperature rose exothermically to 190° C. and then fell to 157° C. during 9 minutes. The solution was heated for an additional 30 minutes at 150° C. Analysis by gas chromatography showed only 3% by weight of the feed butadiene remained unreacted. The products contained by weight 56.8% 1,5-cyclooctadiene, 39.0% 4-vinylcyclohexene, 1.4% of other compounds in the $C_8$ range, and 2.8% of butadiene trimer.

Example X

This example illustrates the general applicability of the cobalt- and nickel-containing complexes of the present invention to the saturation of both aliphatically and aromatically unsaturated linkages by hydrogenation. Using a hydrogen pressure of 550 p.s.i.a., the following results were obtained.

Example XI

To illustrate the applicability of the complexes of the present invention to the reduction of the oxidation state of functional groups of organic compounds by hydrogenation, benzaldehyde was hydrogenated using 15 ml. of hydrogen tetrakis(triethyl phosphite) cobaltate (−1) with 15 ml. of benzaldehyde at a temperature of 150° C., and an initial hydrogen pressure of 85 p.s.i.a.

The run was repeated a number of times with the total $H_2$ reacting varying from 27.1 to 37.7 millimoles. The reaction products included benzyl alcohol, part of which was in turn reduced to toluene.

The hydrogenation of benzaldehyde was again repeated but using as catalyst tetrakis(triethyl phosphite)nickel(O). A product consisting essential of toluene was obtained.

I claim as my invention:

1. Tetrakis(trihydrocarbyl phosphite)cobalt(O).
2. Tetrakis(trialkyl phosphite)cobalt(O), wherein the alkyls contain from 1 to 20 carbon atoms.
3. Tetrakis(triethyl phosphite)cobalt(O).
4. Tetrakis(trimethyl phosphite)cobalt(O).
5. Tetrakis[tri(2-ethylhexyl)phosphite]cobalt(O).
6. Hydrogen tetrakis(triethyl phosphite)cobaltate.
7. Tetrakis[tris(beta-chloroethyl)phosphite]cobalt(O).
8. Tetrakis(para-cresyl phosphite)cobalt(O).
9. The process for lowering the valence state of cobalt while simultaneously preparing a compound thereof with a trihydrocarbyl phosphite, which comprises dissolving in said phosphite compound a cobalt salt soluble therein, and hydrogenating the solution with molecular hydrogen.
10. The process for lowering the valence state of cobalt while simultaneously preparing a compound thereof with a trialkyl phosphite, wherein the alkyls contain from 1–20 carbon atoms, which comprises dissolving in said phosphite compound a cobalt salt soluble therein and hydrogenating the resulting solution with molecular hydrogen.
11. The process in accordance with claim 10 wherein said cobalt salt is a salt of an acid selected from the group consisting of inorganic and alkanoic acids.
12. The process in accordance with claim 10 wherein the hydrogenation is conducted in the presence of a minor amount of nitrobenzene.
13. The process in accordance with claim 10 wherein the hydrogenation is conducted in the presence of cyanide anion.
14. The process in accordance with claim 10 wherein said cobalt salt is cobalt acetate and the trialkyl phosphite is triethyl phosphite.

| Run No. | Complex Catalyst Prepared from | | Organic Compound to be Hydrogenated | | Temp., °C. | Millimoles $H_2$ | | Product |
|---|---|---|---|---|---|---|---|---|
| | Triethyl Phosphite, ml. | Cobalt Acetate, millimoles | Identity | ml. | | Maximum Rate of Absorption per Hour | Total Absorbed | |
| 1 | 10 | 5 | 1-octene | 20 | 195 | 12.4 | 6.9 | n-Octane. |
| 2 | 30 | 2 | ----do---- | 30 | 195 | 2.1 | 30 | Do. |
| 3 [1] | 30 | 2 | ----do---- | 30 | 195 | 1.0 | 19 | Do. |
| 4 [2] | 15 | 2 | ----do---- | 15 | 195 | 5.2 | 31 | Do. |
| 5 | 30 | 2 | Naphthalene | 15 g | 220 | 1.1 | 18 | Tetralin. |

[1] Two pellets of KOH added to the reactor after preparation of the catalyst.
[2] Two millimoles of phenanthroline were added to the prepared catalyst before hydrogenation of the 1-octene. An insoluble complex formed but was dissolved in 15 ml. of diethylene glycol diethyl ether.

No references cited.

TOBIAS E. LEVOW, *Primary Examiner.*

E. C. BARTLETT, A. DEMERS, *Assistant Examiners.*